July 21, 1959
H. ORNER
2,895,343
BALL-BEARING SCREW AND NUT MECHANISM
Filed Oct. 1, 1954
2 Sheets-Sheet 1
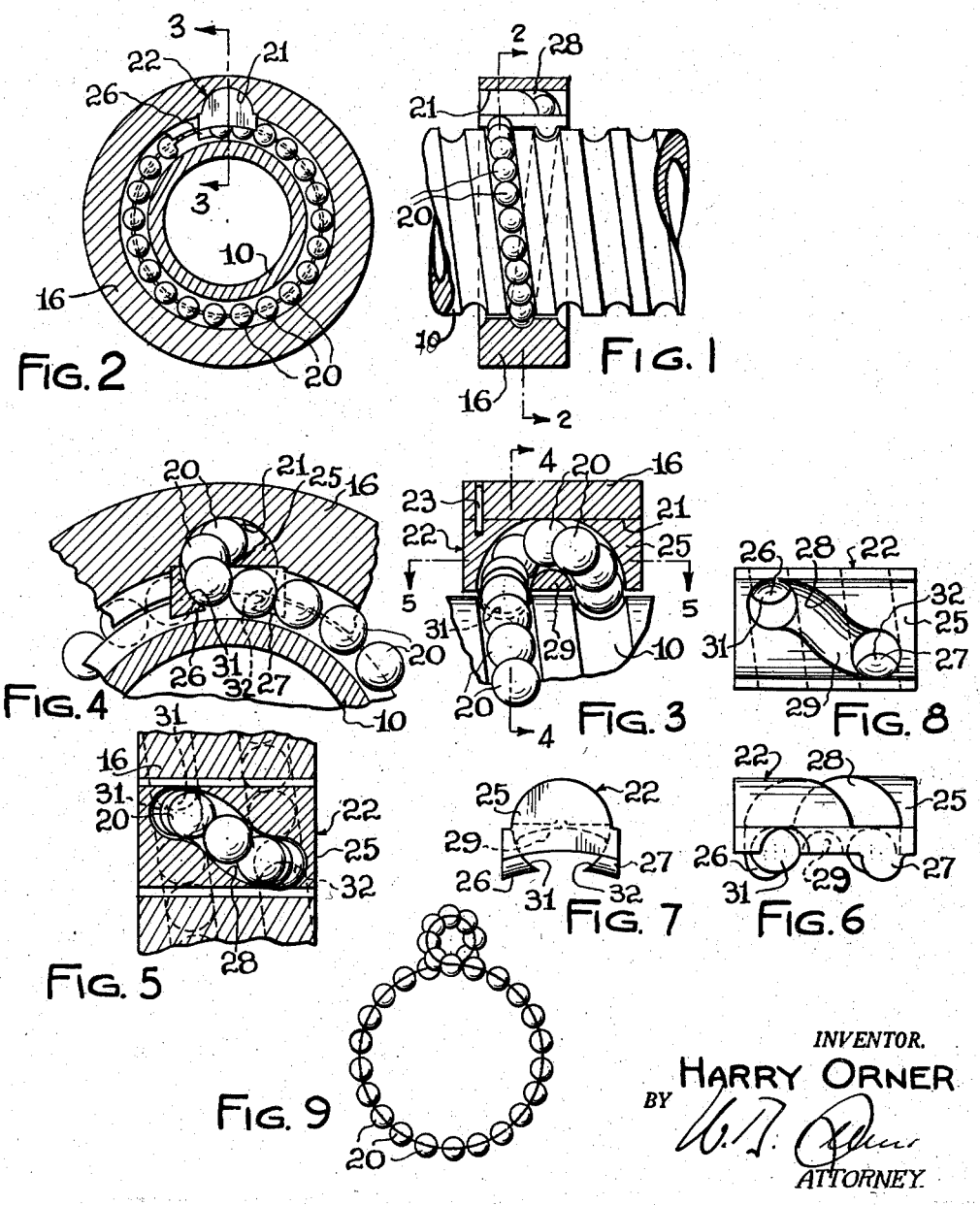
INVENTOR.
HARRY ORNER
ATTORNEY.

July 21, 1959

H. ORNER 2,895,343

BALL-BEARING SCREW AND NUT MECHANISM

Filed Oct. 1, 1954

INVENTOR.
HARRY ORNER
BY
ATTORNEY

United States Patent Office 2,895,343
Patented July 21, 1959

2,895,343

BALL-BEARING SCREW AND NUT MECHANISM

Harry Orner, Altadena, Calif.

Application October 1, 1954, Serial No. 459,605

15 Claims. (Cl. 74—459)

This invention relates to a ball-bearing screw and nut mechanism, and particularly to an improved means for shifting the balls over the crest of the screw thread from one end of a single-turn ball race loop to the other end thereof.

Ball-bearing screw and nut mechanisms are widely used for a number of applications in which it is desired to transform rotary motion to linear motion, or vice versa. Such mechanisms conventionally comprise a helical ball race formed of a number of turns between the screw and nut, and a relatively long external tube for returning the balls from one end of the ball race to the other. The conventional constructions, however, are disadvantageous in that an external ball return tube is subject to breaking and bending. Furthermore, the relatively long ball return tube, whether external or internal, results in the creation of a large amount of friction or rubbing tending to hinder the ball movement, with consequent increase in the overall friction of the device.

The disadvantages of the long external ball return tube, and other relatively long return passages, are eliminated in the structures described and claimed in my co-pending application Serial No. 371,253 filed July 30, 1953, for a Ball-Bearing Screw and Nut Mechanism, and in my co-pending application Serial No. 434,541 filed June 4, 1954, for a Deflector Pin Construction for Ball-Bearing Screw and Nut Mechanisms. The described structures incorporate a plurality of individual nuts each adapted to return the balls over the crest of the screw thread from one end of a single ball race turn to the other end thereof. By virtue of the construction in which each turn of the helix constitutes, in effect, a single ball race, there is no necessity for an external or long ball return tube and the overall friction of the mechanism is greatly reduced.

In the structures shown in the cited co-pending applications, as well as in other constructions in which only a single ball race turn is employed and the balls are guided over the crest of the screw thread from one end of the single turn to the other end thereof, the balls always continue in the same general direction and make, at most, a right angle turn when passing over the screw thread crest. In such constructions the balls travel a minimum distance in passing over the thread crest, but the friction and inertia effects inherent in the making of the relatively abrupt turn may be undesirably great. The friction results not only from the fact that the sharp turn over the thread crest creates a substantial amount of rubbing between the balls and the ball deflectors and nut, but also because the balls do not and could not travel a path which is a continuous smooth curve, that is to say a path having true curvilinear continuity.

In view of the above factors characteristic of ball-bearing screw and nut mechanisms in general, and particularly of ball-bearing screw and nut mechanisms of the type in which the balls are returned over a single crest of the screw thread as described above, it is an object of the present invention to provide an improved ball-return mechanism so constructed that the ball race takes the general form of a figure eight, and there is true curvilinear continuity at all points in the ball race so that friction and other losses are reduced to the very minimum.

Another object of the invention is to provide a ball return means constructed to guide the balls over the screw thread crest in the form of a loop instead of a mere turn, so that the balls actually reverse direction two times before passing from one end of the single helix turn to the other end thereof.

A further object of the invention is to provide a highly simple and economical nut means incorporating devices for causing the ball race to take the form of a figure 8.

These and other objects and advantages of the invention will be more fully set forth in the following specification and claims considered in connection with the attached drawings to which they relate.

In the drawings:

Figure 1 is a view partly in longitudinal central section of one preferred embodiment of a ball bearing nut and screw mechanism incorporating the present invention.

Figure 2 is a transverse sectional view taken on the broken line 2—2 of Figure 1 and as viewed in the direction of the arrows;

Figure 3 is an enlarged fragmentary sectional view taken on line 3—3 of Figure 2;

Figure 4 is a fragmentary sectional view taken on line 4—4 of Figure 3;

Figure 5 is a fragmentary sectional view taken on line 5—5 of Figure 3;

Figure 6 is a detail side elevational view showing the ball return insert removed from the nut section;

Figure 7 is an end elevation of the structure of Figure 6;

Figure 8 is a plan view of the structure of Figure 6;

Figure 9 is an exaggerated schematic view looking axially of the nut and showing the balls in figure eight relationship;

Figure 11:
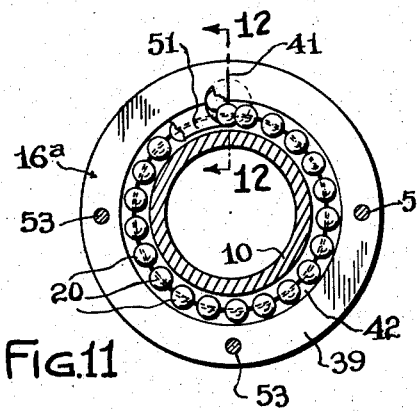
Figure 11 is a transverse section along line 11—11 of Figure 10.
Figure 10:
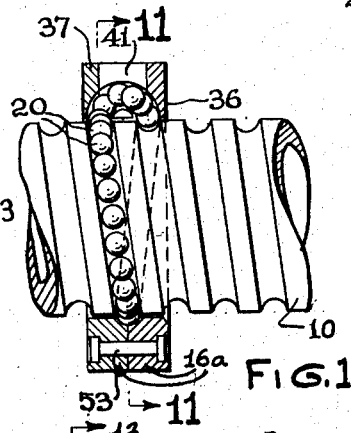
Figure 10 is a longitudinal sectional view corresponding generally to Figure 1 but showing a second embodiment of the invention, and in which the nut is formed of two mating sections so formed as to avoid need for a separate ball return insert.

Referring to Figure 1, there is shown one preferred embodiment of the invention comprising a helically grooved screw 10 rotatably supporting thereon a ball bearing nut segment 16. Nut segment 16 is shaped with an internal helical groove corresponding to the external groove on screw 10 and mating therewith to form the major loop of the race for a plurality of balls 20. The balls 20 are mounted in approximately a single turn or loop of the screw and nut grooves, the end portions of this single turn being, however, overlapped slightly as shown. The overlapped turn ends are located at a generally semi-cylindrical bore or internal channel 21 which is formed in nut 16 and extends axially for the full width thereof. Channel 21 serves to receive a ball return insert 22 employed to transfer the balls 20 from one end of the single turn to the other end thereof, and to complete the ball race.

Insert 22 may be secured in nut segment 16 by any suitable means such as by welding, or by use of pins 23 as shown in Figure 3. The insert may be formed from metal or plastic and by use of die casting, injection molding, powdered metal, or other techniques.

According to the present invention, insert 22 is so constructed that the balls 20 passing over the screw thread crest will reverse direction two times and in a smooth curve, and will form a second small diameter loop merging with the ends of the large diameter loop providing a complete ball race having the shape of a figure eight as illustrated in Figure 9. More specifically, insert 22 is constructed with a generally semi-cylindrical body 25 corresponding to bore 21, and with depending ears 26 and 27 formed one at each end portion of body 25 and on opposite sides thereof. The ears 26 and 27 depend into the groove in screw 10 and serve the functions of scooping the balls 20 out of the large diameter loop of the figure eight ball race and into the small diameter loop in the insert, as well as of guiding the balls back into the large diameter loop after the screw thread crest has been traversed.

The loop-shaped passage means through insert 22 over the screw thread crest take the form of a groove 28 extending generally diagonal or oblique to the longitudinal axis of insert body 25 as viewed in Figures 6 and 8, and terminating at the ears 26 and 27. Groove 28 is open at the upper or semi-cylindrical wall of insert body 25, so that the balls 20 will actually roll on the corresponding semi-cylindrical wall of bore 21 in the nut segment 16, but is closed over the screw thread crest by a transverse bridge 29 (Figure 3) which serves to complete the ball transfer and maintain the balls out of contact with the screw thread. As best illustrated in Figures 4 and 7, ears 26 and 27 are formed, respectively, with faces 31 and 32 which are curved to have the same radius and center as the wall of nut bore 21, so that these faces 31 and 32 are in perfect cylindrical or curvilinear continuity with the bore wall. In order to provide for this continuity, the ears 26 and 27 are recessed back into the nut body, and protrude outwardly from the insert body 25 as illustrated.

In the operation of the form of the invention shown in Figures 2–9, let it be assumed that screw 10 is being rotated counterclockwise relative to nut 16 and as viewed in Figures 2 and 4. The balls in the large diameter race loop formed by the mating grooves of the screw and nut will therefore roll counterclockwise relative to nut 16 until they engage face 31 of ear 26. The balls will then roll up face 31 in a smooth curve and onto the wall of bore or channel 21, these surfaces being in true curvilinear continuity due to the fact that face 31 lies on the interior surface of the same hypothetical cylinder, extending longitudinally of the screw, as the bore wall. Balls 20 then loop backwardly and outwardly through groove 28 between the overlapped ends of the large diameter race loop or single turn. The balls are thus guided by the wall of channel 21, by the side walls of the insert body 25, and by the upper rounded wall of bridge 29 until they roll onto the face 32 of ear 27.

It is to be noted that the balls in rolling upwardly on face 31 and into groove 28 reverse direction and are guided back over a screw thread crest in the small loop of the figure eight race, after which the balls again reverse direction in rolling downwardly onto face 32 of ear 27 and back into the large loop or single turn between the screw and nut. There is absolutely no break in the continuity of the walls over which the balls 20 are guided, and there are no sharp points or friction generators in the entire figure eight race. The balls thus move through the entire race in an extremely frictionless manner so that the efficiency of the screw and nut mechanism is greatly increased as compared to former structures in which the balls did not roll in a figure eight but instead merely make a generally right angled turn over the screw thread crest.

Figure 13:
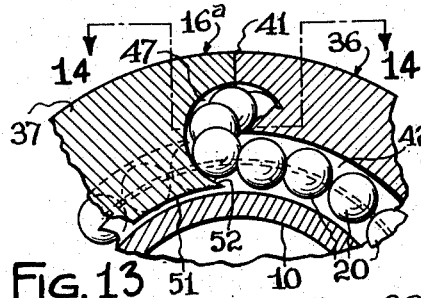
Figure 13 is a section on line 13—13 of Figure 12.
Figure 12:
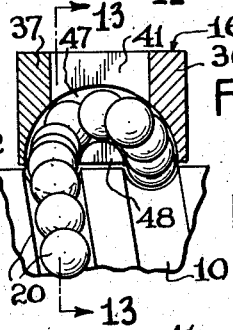
Figure 12 is an enlarged fragmentary sectional view taken along line 12—12 of Figure 11.
Figure 18:
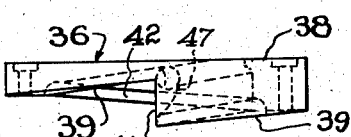
Figure 18 is a plan view of the showing of Figure 17.
Figure 14:
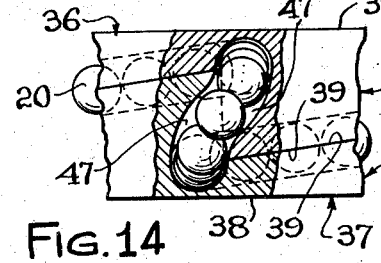
Figure 14 is a view, partly in plan and partly in section, taken along the broken line 14—14 of Figure 13.
Figure 16:
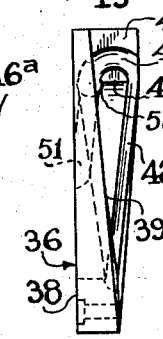
Figure 16 is a side elevation of a single nut segment section.
Figure 15:
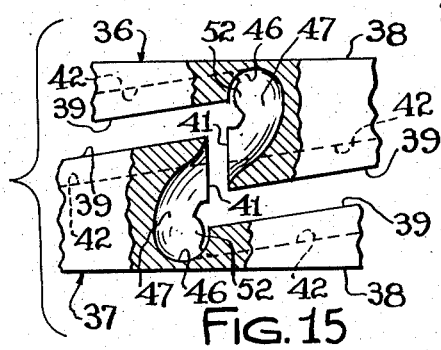
Figure 15 is an exploded fragmentary view illustrating the ball return parts of the two mating nut segment sections.

Referring next to Figures 11–18, a second embodiment of the invention is illustrated and in which the operation is much the same but in which no insert is employed. Instead, each nut segment 16a is formed of two identical sections 36 and 37 which may be formed in the same die and are merely placed face to face and secured together to complete their assembly into a completed segment. The nut segment sections 36 and 37 being identical to each other and being merely reversed when assembled as shown in Figure 15, only one will be described.

Section 36 is formed with an annular wall 38 lying in a plane perpendicular to the screw axis, and with a second wall 39 having the shape of a single helix turn with the same pitch or lead as that of screw 10. Between the ends of helical wall 39 is formed an irregularly contoured radial wall 41 the face of which is recessed to provide the ball return path as will be described subsequently. The inner edge of helical wall 39 is grooved at 42 in such a way that a complete nut groove (single turn) will be formed when sections 36 and 37 are assembled.

Formed in nut segment section 36 at one end of groove 42, adjacent wall 38, is an opening 46 communicating with a transfer groove 47. The groove 47 loops backwardly and obliquely toward the other end of groove 42, and defines half of a bridge 48 over which the balls 20 pass when traversing the thread crest.

Figure 17:
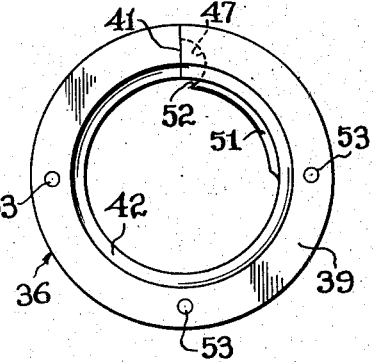
Figure 17 is an end elevation of the segment section shown in Figure 16, and as viewed from the right thereof.

As shown in Figures 13 and 17, a scoop portion 51 is formed integral with segment section 36 radially inwardly of opening 46 and extends for a substantial distance in the direction opposite from the adjacent end of groove 42 and helical wall 39. The ball engaging face 52 of scoop portion 51 is continuous with, and lies along the interior wall of the same hypothetical cylinder as, the outer wall of groove 47 through which the balls pass.

To assemble a nut segment 16a the two sections 36 and 37 are first placed with their helical walls 39 and longitudinal walls 41 abutting as shown in Figure 15. Sections 36 and 37 are then fastened together, for example by pins 53, to complete the construction. It is pointed out that the described split construction of the nut segments 16a has no effect on their efficiency since the load is not applied to the split portion but instead to the continuous unsplit side portions of the race.

When the sections 36 and 37 are assembled as described, and as shown in Figure 14, the grooves 47 of the two sections mate with each other to form a continuous loop path or passage from the opening 46 of one section to the opening 46 of the other section. The ends of the large diameter loop of the ball race being overlapped slightly, as illustrated, this return passage causes the balls 20 to reverse direction twice and move upwardly and backwardly from one end of the large loop to the other end, so that a figure eight race is again formed as shown in Figure 9. As previously indicated, the faces 52 of scoop portions 51 are continuous with the outer wall of the passage formed by grooves 47 of the sections 36 and 37, and lie along the wall of a cylinder extending longitudinally of the screw, so that perfect curvilinear continuity is achieved and friction is minimized. The balls in traversing the screw thread crest pass over the bridge 48 defined half by one section 36 and half by the other section 37.

In the operation of the embodiment shown in Figures 11–18, let it be assumed that the screw 10 is rotating counterclockwise, as viewed in Figures 11 and 13, relative to the stationary nut 16a. The balls 20 will then roll counterclockwise into engagement with face 52 of scoop portion 51 of nut segment section 37, and will roll upwardly through opening 46 and along the upper wall of the loop passage formed by grooves 47. After reversing direction twice in a continuous loop as described, the balls will roll down through opening 46 of section 36 and down face 52 of that section into the large loop between the nut segment and the screw.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A ball-bearing screw and nut mechanism, comprising a screw having an external helical groove, a nut having an internal helical groove, said grooves mating with each other to form a working ball race loop of substantially a single convolution, a single convoluted passage means in said nut forming a return ball race loop, said passage means having substantially the same pitch as the pitch of said working loop but reversely arranged thereto with the ends of said return loop merging with the ends of said working loop to form a continuous ball race having a figure eight configuration with the return loop lying in the same general plane transversely of the screw as the working ball loop and being free of abrupt change in the direction of ball travel therealong, and a plurality of balls mounted in said continuous ball race and serving to lock said nut and screw in assembled relation.

2. A ball-bearing screw and nut mechanism comprising, a screw having an external continuous helical groove of many convolutions, a nut surrounding said screw having an internal helical groove of the same pitch and direction as the groove in said screw, said nut having loop passage means within the body thereof lying substantially outside the perimeter of said first-mentioned helical groove, said loop passage means having a single convolution substantially of the same pitch as said mentioned groove with the ends thereof overlapping and merging with the ends respectively of said helical groove and cooperating therewith to form a continuous ball race having a figure eight configuration including but a single helical loop and a single ball return loop passage, said ball return loop passage lying in the same general plane transversely of the screw as said single helical groove and lying in the same general plane transversely of the screw as said loop passage and being free of abrupt change in the direction of ball travel therealong, and a plurality of balls substantially filling said figure eight ball race and providing an anti-friction lock for holding said nut rotatively assembled to said screw.

3. A ball-bearing screw and nut mechanism, comprising a screw having an external helical groove, a nut having an internal helical groove of a single convolution and corresponding to said screw groove and cooperating therewith to form a working groove, said nut being formed by a pair of identical annular members split along a cleavage co-extensive with the axis of the groove in said nut as well as along a radial cleavage extending between the ends of said single convolution, passage means formed partially in the mating faces of each of said radial cleavages and cooperating with one another to form a return groove interconnecting the ends of said working groove, a plurality of balls held captive within said helical working and return grooves, and means for holding said pair of annular members together about said screw.

4. A ball-bearing screw and nut mechanism comprising, a screw having an external helical groove therealong, a nut therefor having a similar internal groove therein of the same pitch and cooperating with said screw groove to form a one-turn working groove the ends of which are spaced inwardly of the opposite end faces of said nut, return passage means in the body of said nut having substantially the same pitch as said one-turn working groove, the ends of said return passage means merging with the ends of said working groove and cooperating therewith and with the groove in said screw to form a continuous ball raceway having a figure eight configuration, said nut being separable into two rings along a radial cleavage line substantially co-extensive with the axis of said figure eight ball raceway, and means for holding said rings together about said screw.

5. A ball-bearing screw and nut mechanism as defined in claim 4 including scoop means integral with each of said rings at the junction of the working and return grooves for guiding said balls into and out of said passage means.

6. A ball-bearing screw and nut raceway as defined in claim 4 wherein said raceway of figure eight configuration is arcuate in cross section throughout its length.

7. In a ball-bearing screw and nut assembly of the type having a nut held assembled about a screw by an endless series of balls located in helical grooves between said nut and screw, that improvement comprising a loop ball-return groove formed in the nut having a pair of ends merging substantially tangentially with the opposite ends of a load groove of at least one full convolution formed in said nut, said ball-return groove and said load groove cooperating to form an endless figure-eight continuous circuit for balls free of abrupt change in the direction of ball travel therealong.

8. In a ball bearing screw and nut mechanism, comprising a screw having an external helical groove, a nut having an internal helical groove, said grooves mating with each other to form a load ball race loop of at least one full turn, a recirculating passage in said nut forming a second loop, junction means including the respective ends of the said loops merging substantially tangentially to provide a continuous endless ball path free of abrupt change in the direction of ball travel therealong, said second loop extending away from said junction means so that said load and said second loops taken together form an endless ball race having substantially a figure-eight configuration, and a plurality of balls mounted in said ball race.

9. A ball-bearing screw and nut mechanism, comprising a screw having an external helical groove, a nut having an internal helical groove of a single convolution and corresponding to said screw groove and cooperating therewith to form a working groove, said nut being formed by a pair of identical annular members split along a cleavage co-extensive with the axis of the groove in said nut as well as along a radial cleavage extending between the ends of said single convolution, passage means formed partially in the mating faces of each of said radial cleavages and cooperating with one another to form a return groove interconnecting the ends of said working groove, a plurality of balls held captive within said helical working and return grooves, and means for holding said pair of annular members together about said screw.

10. A ball-bearing screw and nut mechanism comprising a screw having an external helical groove therealong, a nut therefor having a similar internal groove therein of the same pitch and cooperating with said screw groove to form a one-turn working groove the ends of which are spaced inwardly of the opposite end faces of said nut, return passage means in the body of said nut, the ends of said return passage means merging with the ends of said working groove and cooperating therewith and with the groove in said screw to form a continuous ball raceway, said nut being separable into two rings along a radial cleavage line substantially co-extensive with the axis of said ball raceway, and means for holding said rings together about said screw.

11. An article of manufacture comprising a unitary insert for mounting in a seating cavity therefor formed in a ball-bearing nut, said insert comprising a body having a generally U-shaped return ball loop passage formed therein with the legs thereof spaced laterally of one another a distance not in excess of the axial length of a single convolution of a helical groove in a ball-bearing nut for use with which said insert is designed, the ends of said loop passage opening through the same side wall of said insert and facing in opposite directions, the opposite end faces of said insert being closed and the bight portion of said return ball loop opening through a different side wall of the insert than said loop ends and being adapted to be closed by an interior wall of the nut cavity with which it is to be assembled.

12. An article of manufacture as defined in claim 11 wherein the said insert has a main body of generally cylindrical contour with one side cut away in major part along a radius conforming with the radius of the central opening of a nut with which the insert is to be used, the ends of said loop passage opening through the wall formed by said cut-away portion of the insert.

13. An article of manufacture as defined in claim 11 wherein the oppositely directed ends of said return loop passage include ball pickup elements shaped to extend into a load groove convolution of a ball-bearing screw and adapted to guide balls to and from the opposite ends of a single convolution thereof.

14. An article of manufacture comprising a unitary one-piece insert for mounting in a complementary seating cavity therefor extending crosswise of a ball bearing nut with one face thereof adapted to open into the grooved inner annular surface of the nut, said insert having a main body, a major portion of the exterior surface of said main body being cylindrical, a generally spiral return ball loop formed in said body about the longitudinal axis thereof with a portion of said loop opening through said cylindrical surface, said spiral ball return loop having its opposite ends spaced inwardly of the adjacent axial ends of said main body and positioned radially opposite and adapted to open into a juxtaposed load groove of a ball-bearing screw with which said insert is designed to be used.

15. An article of manufacture comprising a unitary one-piece insert for mounting in a complementary seating cavity therefor extending crosswise of a ball bearing nut with one face thereof adapted to open into the grooved inner annular surface of the nut, a major portion of the exterior surface of said insert being cylindrical, a generally spiral return ball loop extending along said cylindrical surface and opening outwardly therethrough for at least a portion of its length, the opposite ends of said loop terminating inwardly of the opposite ends of said insert and being positioned to lie substantially radially opposite the load groove portion of a ball bearing screw with which said insert is adapted to be used.

References Cited in the file of this patent

UNITED STATES PATENTS

| | | |
|---|---|---|
| 2,519,777 | Mill | Aug. 22, 1950 |
| 2,636,397 | Jacubenta | Apr. 28, 1953 |

FOREIGN PATENTS

| | | |
|---|---|---|
| 272,047 | Switzerland | Feb. 16, 1951 |
| 328,655 | Germany | Nov. 3, 1920 |
| 332,614 | Germany | Feb. 4, 1921 |
| 725,181 | Germany | Sept. 16, 1942 |